United States Patent
Robertsson et al.

(10) Patent No.: US 7,480,204 B2
(45) Date of Patent: Jan. 20, 2009

(54) SEISMIC DATA PROCESSING (75) Inventors: Johan Olof Anders Robertsson, Oslo (NO); Julian Edward Kragh, Finchingfield (GB); Dirk-Jan Van Manen, Oslo (NO); Philippe Caprioli, Horley (GB)

(73) Assignee: WesternGeco L.L.C., Houston, TX (US)

( * ) Notice: Subject to any disclaimer, the term of this patent is extended or adjusted under 35 U.S.C. 154(b) by 17 days.

(21) Appl. No.: 11/641,241

(22) Filed: Dec. 19, 2006

(65) Prior Publication Data

US 2008/0008039 A1 Jan. 10, 2008

Related U.S. Application Data (60) Provisional application No. 60/806,766, filed on Jul. 7, 2006.

(51) Int. Cl.
*G01V 1/38* (2006.01)
(52) U.S. Cl. .............................. 367/19; 181/110; 702/17
(58) Field of Classification Search ................. 181/110; 367/19; 702/17
See application file for complete search history.

(56) References Cited

U.S. PATENT DOCUMENTS

| | | | | | |
|---|---|---|---|---|---|
| 3,940,734 | A | * | 2/1976 | Blum | 367/63 |
| 4,298,966 | A | * | 11/1981 | Ruehle | 367/50 |
| 4,363,113 | A | * | 12/1982 | Taner et al. | 367/63 |
| 4,627,036 | A | * | 12/1986 | Wyatt | 367/57 |
| 4,635,238 | A | * | 1/1987 | Gallagher et al. | 367/40 |
| 4,706,223 | A | * | 11/1987 | Zimmerman | 367/38 |
| 4,736,347 | A | * | 4/1988 | Goldberg et al. | 367/46 |
| 4,802,146 | A | * | 1/1989 | Moeckel | 367/52 |
| 4,802,147 | A | * | 1/1989 | Moeckel | 367/57 |
| 4,881,207 | A | * | 11/1989 | Dubesset et al. | 367/31 |
| 4,894,809 | A | * | 1/1990 | Moeckel | 367/57 |
| 5,051,961 | A | * | 9/1991 | Corrigan et al. | 367/24 |
| 5,170,377 | A | * | 12/1992 | Manzur et al. | 367/73 |
| 5,587,942 | A | * | 12/1996 | Krebs | 367/50 |
| 5,596,548 | A | * | 1/1997 | Krebs | 367/56 |
| 5,696,735 | A | * | 12/1997 | Krebs | 367/50 |
| 5,742,560 | A | * | 4/1998 | Krebs | 367/57 |
| 6,002,642 | A | * | 12/1999 | Krebs | 367/73 |
| 6,128,580 | A | * | 10/2000 | Thomsen | 702/18 |

(Continued)

FOREIGN PATENT DOCUMENTS

JP 56069573 A * 6/1981

OTHER PUBLICATIONS

Lay, David C. Linear Algebra and Its Applications. 2$^{nd}$ Edition. p. 380. 1997.*

(Continued)

*Primary Examiner*—Jack W Keith
*Assistant Examiner*—Ari M Diacou
(74) *Attorney, Agent, or Firm*—Ari Pramudji; Liangang (Mark) Ye; Jeffrey E. Griffin (57) ABSTRACT

Implementations of various technologies for processing seismic data. In one implementation, the seismic data may be processed by creating a fictitious source-receiver line connecting a source with a receiver location of interest, projecting one or more receiver locations adjacent the receiver location of interest onto the fictitious source-receiver line and decomposing seismic data on the receiver locations disposed on the fictitious source-receiver line into up-going wavefields and down-going wavefields.

28 Claims, 4 Drawing Sheets

U.S. PATENT DOCUMENTS

| | | | | |
|---|---|---|---|---|
| 6,147,929 | A * | 11/2000 | Parra | 367/69 |
| 6,665,618 | B1 * | 12/2003 | Thomas et al. | 702/14 |
| 6,747,913 | B2 * | 6/2004 | Fokkema et al. | 367/24 |
| 6,775,618 | B1 * | 8/2004 | Robertsson et al. | 702/14 |
| 6,856,911 | B2 * | 2/2005 | Wang et al. | 702/14 |
| 6,917,881 | B2 * | 7/2005 | Dubois et al. | 702/14 |
| 6,980,482 | B2 * | 12/2005 | Faichney et al. | 367/73 |
| 7,319,636 | B2 * | 1/2008 | Robertsson et al. | 367/21 |
| 7,359,284 | B2 * | 4/2008 | Fuller et al. | 367/57 |
| 2002/0044498 | A1 * | 4/2002 | Krebs et al. | 367/27 |
| 2003/0147306 | A1 * | 8/2003 | Robertsson | 367/24 |
| 2004/0022127 | A1 * | 2/2004 | Faichney et al. | 367/73 |
| 2004/0024530 | A1 * | 2/2004 | Wang et al. | 702/1 |
| 2004/0068376 | A1 * | 4/2004 | Aronstam | 702/14 |
| 2005/0013194 | A1 * | 1/2005 | Vaage et al. | 367/24 |
| 2005/0174886 | A1 * | 8/2005 | Fuller et al. | 367/57 |
| 2006/0074562 | A1 * | 4/2006 | Amundsen et al. | 702/18 |
| 2006/0239117 | A1 * | 10/2006 | Singh et al. | 367/20 |
| 2006/0250890 | A1 * | 11/2006 | van den Berg et al. | 367/24 |
| 2007/0025182 | A1 * | 2/2007 | Robertsson | 367/18 |
| 2007/0189117 | A1 * | 8/2007 | Robertsson et al. | 367/24 |
| 2008/0008039 | A1 * | 1/2008 | Robertsson et al. | 367/24 |
| 2008/0019215 | A1 * | 1/2008 | Robertsson et al. | 367/19 |
| 2008/0025147 | A1 * | 1/2008 | Ferber | 367/24 |

OTHER PUBLICATIONS

Foster et al. Multi-dimensioanl inversion of seismic data. Inverse Problems 4 (1988) 71-85.*

Hill et al. Imaging beneath basalt using an over/under towed-streamer configuration. World Oil. May 2006. pp. 55-61.*

Moldoveanu et al. Over/under towed-streamer acquisition: A method to extend seismic bandwidth to both higher and lwoer frequencies. The Leading Edge. Jan. 2007.*

Hill et al. Over/under acquisition and data processing: the next quantum leap in seismic data technology? first break. vol. 24. Jun. 2006.*

Amundsen, "Wavenumber-based filtering of marine point-source data," *Geophysics*, 58(9):1335-1348, 1993.

Muijs, et al., "Data-driven adaptive decomposition of multicomponent seabed recordings," *Geophysics*, 69(5):1329-1337, 2004.

* cited by examiner

SEISMIC DATA PROCESSING

The current non-provisional patent application claims the priority of provisional patent application Ser. No. 60/806,766, filed on Jul. 7, 2006 by the same inventors, with the same title.

BACKGROUND

1. Field of the Invention

Implementations of various technologies described herein generally relate to seismic data processing, and more particularly, processing seismic data using filters, such as 2D filters.

2. Description of the Related Art

The following descriptions and examples are not admitted to be prior art by virtue of their inclusion within this section.

Seismic exploration is widely used to locate and/or survey subterranean geological formations for hydrocarbon deposits. Since many commercially valuable hydrocarbon deposits are located beneath bodies of water, various types of marine seismic surveys have been developed. In a typical marine seismic survey, seismic streamers are towed behind a survey vessel. The seismic streamers may be several thousand meters long and contain a large number of sensors, such as hydrophones, geophones, and associated electronic equipment, which are distributed along the length of the each seismic streamer cable. The survey vessel also includes one or more seismic sources, such as air guns and the like.

As the seismic streamers are towed behind the survey vessel, acoustic signals, commonly referred to as "shots," produced by the one or more seismic sources are directed down through the water into strata beneath the water bottom, where they are reflected from the various subterranean geological formations. Reflected signals are received by the sensors, digitized, and then transmitted to the survey vessel. The digitized signals are referred to as "traces" and are recorded and at least partially processed by a signal processing unit deployed on the survey vessel. The ultimate aim of this process is to build up a representation of the subterranean geological formations beneath the streamers. Analysis of the representation may indicate probable locations of hydrocarbon deposits in the subterranean geological formations.

The seismic streamers may be in an over/under configuration, i.e., one set of streamers being suspended above another set of streamers. Streamers in an over/under configuration may be towed much deeper than streamers in a conventional single configuration. As a result, broadband data (i.e., both high and low frequencies) may be acquired and the recorded data may be easily separated into up-going wavefields and down-going wavefields.

However, varying vertical separation between the upper streamers and the lower streamers and varying inline separation between the streamers during acquisition have caused problems in the processing of seismic data acquired using over/under configurations. In addition, application of 2D filters to process data acquired from such over/under configurations have also been problematic.

SUMMARY

Described herein are implementations of various technologies for processing seismic data. In one implementation, the seismic data may be processed by creating a fictitious source-receiver line connecting a source with a receiver location of interest, projecting one or more receiver locations adjacent the receiver location of interest onto the fictitious source-receiver line and decomposing seismic data on the receiver locations disposed on the fictitious source-receiver line into up-going wavefields and down-going wavefields.

In another implementation, the seismic data may be processed by: (a) receiving one or more values of seismic survey parameters, (b) creating a fictitious source-receiver line connecting a source with a receiver location of interest, (c) projecting one or more receiver locations adjacent the receiver location of interest onto the fictitious source-receiver line, (d) decomposing seismic data on the receiver locations disposed on the fictitious source-receiver line into up-going wavefields and down-going wavefields using the one or more values, and (e) determining whether the up-going wavefields are consistent with the down-going wavefields.

In another implementation, the seismic data may be processed by receiving one or more parameters of an over/under streamer pair, decomposing seismic data into up-going wavefields and down-going wavefields using the one or more parameters, and determining whether the up-going wavefields are consistent with the down-going wavefields.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1:
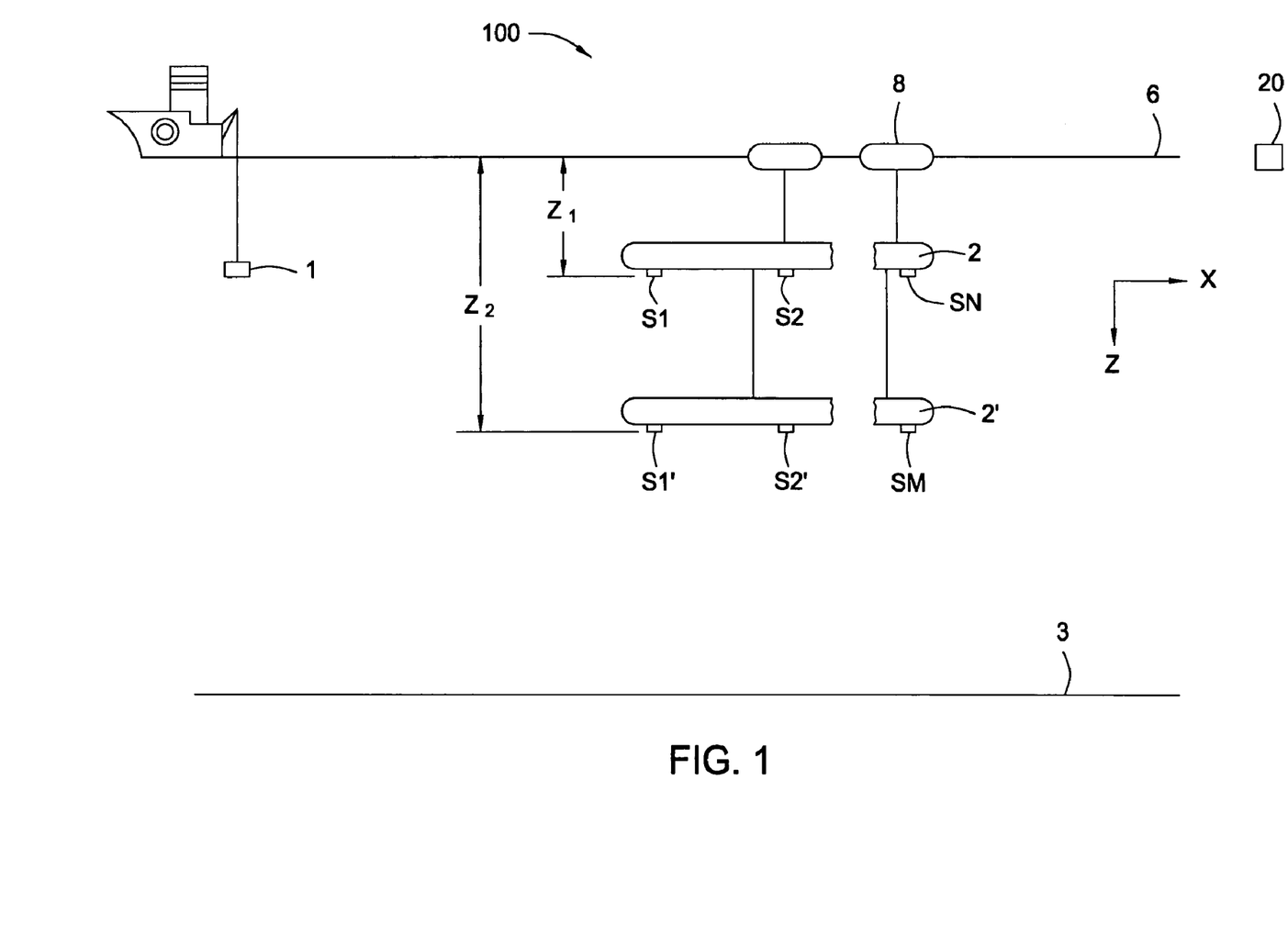
FIG. 1 illustrates a schematic diagram of a marine seismic survey in accordance with implementations of various technologies described herein.

FIG. 1 illustrates a schematic diagram of a marine seismic survey 100 in accordance with implementations of various technologies described herein. In one implementation, the marine seismic survey 100 may include a source array 1 configured for emitting seismic energy, and a first streamer 2 and a second streamer 2' both suspended within a water column at different depths below the surface of the sea 6. The second streamer 2' may be suspended below the first streamer 2. The second streamer 2' may be deployed to be nominally vertically below the first streamer 2; however, the action of tides and currents may mean that the second streamer 2' is not always exactly vertically below the first streamer 2. The streamers may be deployed such that the first streamer 2 is deployed at a nominal depth $Z_1$ below the surface 6 of the sea and the second streamer 2' is deployed at a nominal depth $Z_2$ (where $Z_2 > Z_1$) below the surface 6 of the water column. Again, the action of tides and currents and the effect of surface waves may mean that the first and second streamers 2, 2' may not always be at exactly their nominal depths. The separation between the streamers may also vary from the intended value of $\Delta Z$ (where $\Delta Z = Z_2 - Z_1$). This arrangement may be referred to as an over/under combination of the streamers. The term "over" is typically associated with the shallower streamers, e.g., the first streamer 2, and the term "under" is typically associated with the deeper streamers, e.g., the second streamer 2'.

A plurality of pressure sensors may be disposed along each streamer, with the first streamer 2 having pressure sensors S1, S2 . . . SN up to a total of N pressure sensors and the second streamer 2' having pressure sensors S1', S2' . . . SM up to a total of M pressure sensors. Each streamer may have the same number of pressure sensors (in which case N=M). The streamers may be suspended from one or more floats 8 so that all the pressure sensors of the streamer may be at the same depth in a flat sea. Although the streamers have been described as having pressure sensors disposed thereon, it should be understood that in some implementations the one or both streamers may include other types of receivers, such as particle velocity sensors and the like.

The marine seismic survey 100 may further include a processing apparatus 20 for processing seismic data acquired by the pressure sensors on the streamers 2, 2' as a result of actuating the source array 1 to emit seismic energy. The processing apparatus 20 may be located, for example, on shore, on the towing vessel, or on another vessel. Data acquired at the sensors on the streamers may for example be transmitted to a storage means (for example located on the towing vessel) by, for example, an electrical, optical or wireless link (not shown), and may subsequently be passed to the processing apparatus. Alternatively, data acquired at the sensors may be stored for subsequent retrieval in storage means provided on the streamers.

The source array 1 may be an array of airguns or any other type of emitters, such as marine vibrator units and the like. Energy emitted from the source array 1 maybe reflected by the seabed 3 or by other reflectors (not shown) below the seabed 3 and may then be detected by the seismic receivers 2, 2'.

Figure 2:
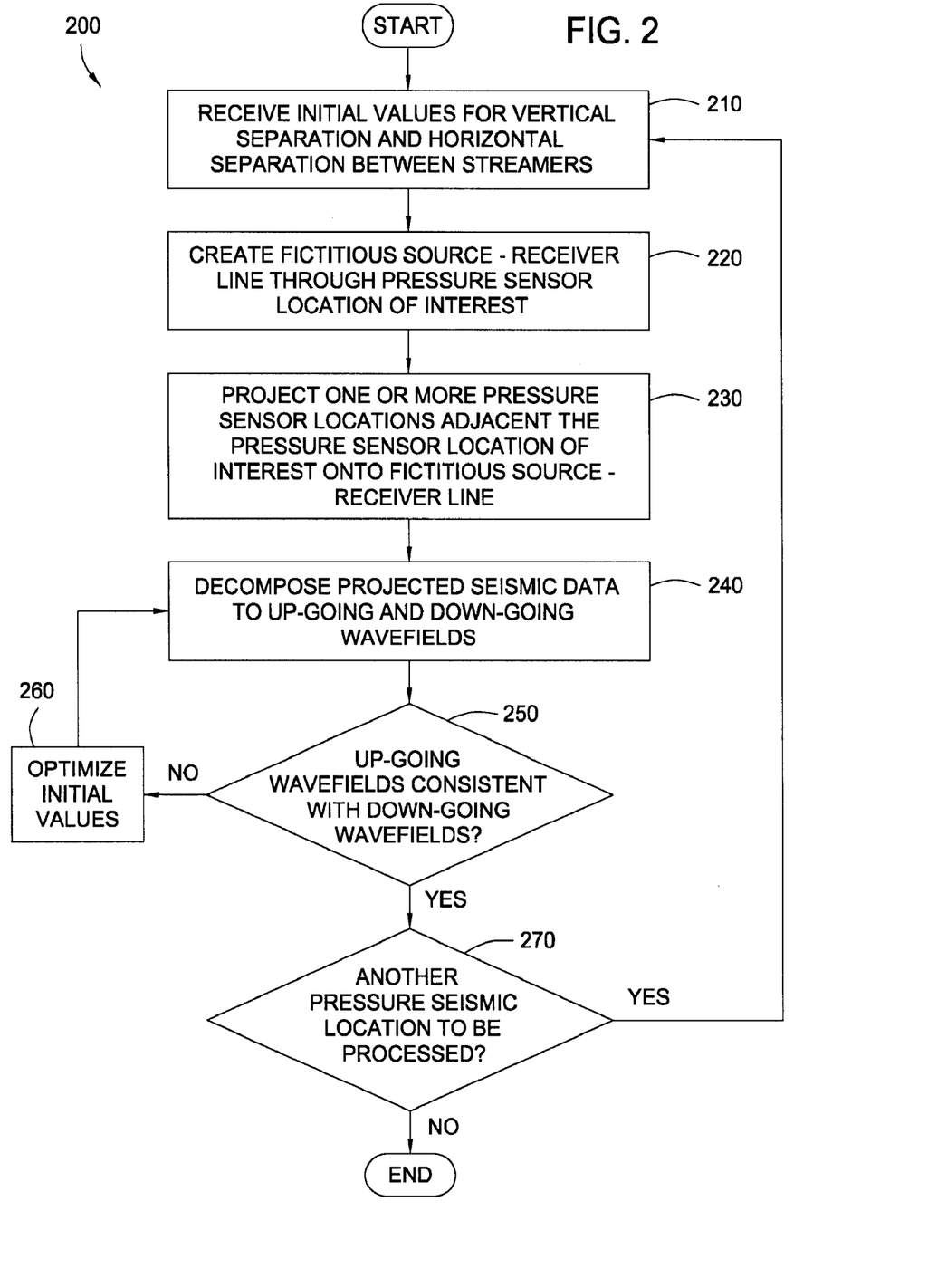
FIG. 2 illustrates a flow diagram of a method for processing seismic data in accordance with implementations of various technologies described herein.

FIG. 2 illustrates a flow diagram of a method 200 for processing seismic data in accordance with implementations of various technologies described herein. Although various implementations are described with reference to seismic data acquired using over/under streamer configuration, it should be understood that in some implementations the seismic data may be acquired by other receiver streamer configurations, such as conventional single streamers, over/under configuration having more than two streamers at various depths, multicomponent streamers and the like. A multicomponent streamer as used herein may be defined as having receiver stations, each having one or more orthogonally oriented particle sensors (e.g., geophones or accelerometers) and a hydrophone.

At step 210, initial values for the vertical distance (or separation) between the first streamer 2 and the second streamer 2' may be provided. These initial values may later be optimized at step 260, which will be described in more detail in the following paragraphs. In one implementation, the initial values may further include the inline (or horizontal) separation between the streamers. The initial values may be obtained from the seismic survey vessel's navigation system, a previous shot, or acquisition log. Although the initial values are discussed herein as including either the vertical separation between the first streamer 2 and the second streamer 2', the inline separation between the streamers or both, it should be understood that in some implementations the initial values may include other seismic survey parameters, such as deviations of streamer locations in the over/under pair in the crossline direction, calibration filters for pressure sensors and the like for over/under streamers; exact wave-height over the streamer as a function of time and pressure sensor location, calibration filters for pressure sensors and the like for (conventional) single streamer configurations; depth of streamer, rotation angles of particle motion sensors, calibration filters for particle motion sensors, calibration filters for pressure sensors and the like for multicomponent streamer configurations.

Figure 3:
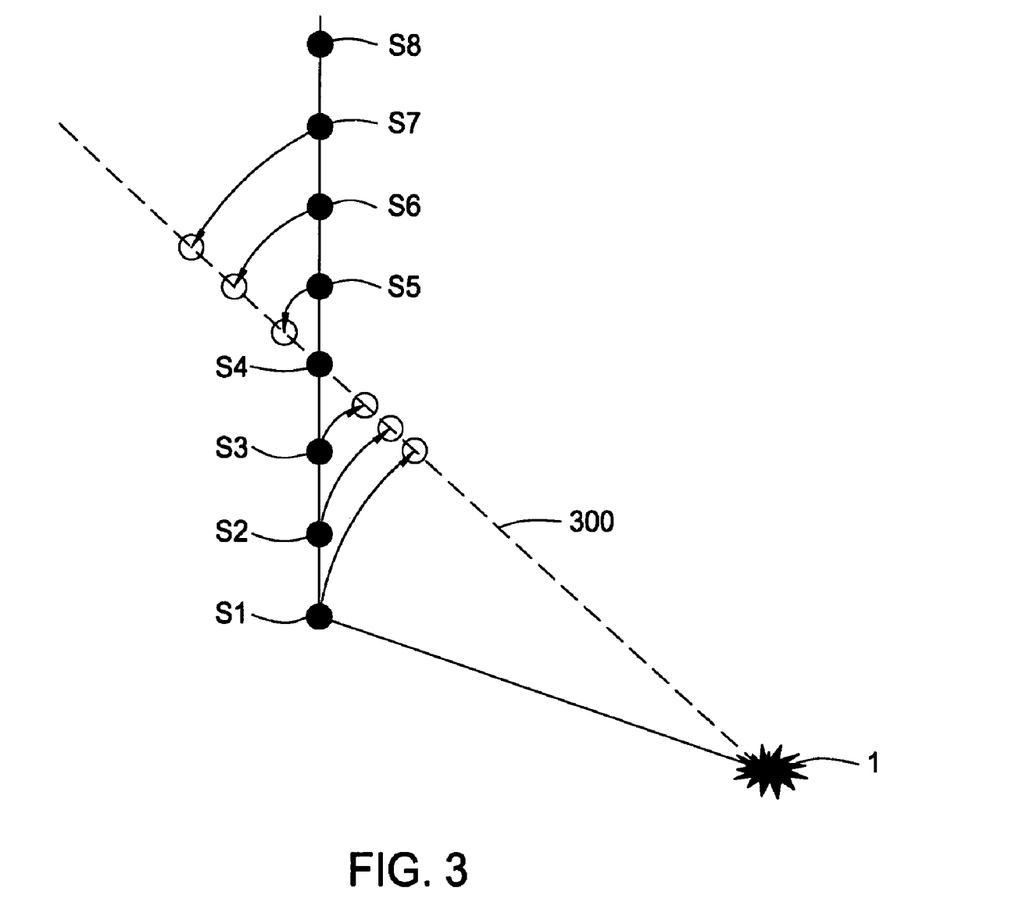
FIG. 3 illustrates an example of a fictitious source-receiver line connecting the source to a pressure sensor of interest in accordance with one implementation of various technologies described herein.

At step 220, a fictitious source-receiver line through a pressure sensor location of interest may be created. FIG. 3 illustrates an example of a fictitious source-receiver line 300 connecting the source 1 to pressure sensor S4, which is the pressure sensor of interest.

At step 230, one or more pressure sensor locations adjacent to the pressure sensor location of interest may be projected to the fictitious source-receiver line. Referring to FIG. 3 again, the location of pressure sensors S1, S2, S3, S5, S6 and S7 may be projected onto the fictitious source-receiver line 300. In one implementation, the adjacent pressure sensors may be projected perpendicularly onto the fictitious source-receiver line. In another implementation, the adjacent pressure sensors may be projected onto the source-receiver line via the shortest arc that maintains the true source-receiver offset such that this arc crosses the fictitious source-receiver line. The number of adjacent pressure sensor locations projected onto the fictitious source-receiver line may determine the size of the spatial aperture of the filter that may be used to perform the decomposition step, described in the paragraphs below. In one implementation, not all of the adjacent pressure sensor locations from the first and second streamers 2, 2' set are projected onto the fictitious source-receiver line. That is, the spatial aperture may be based on less than the total number of pressure sensors on the first and second streamers 2, 2', thereby making the spatial aperture compact. In addition, the fictitious source-receiver line having the pressure sensor location of interest and all the pressure sensor locations projected thereon may be used to represent both first and second streamers pair 2, 2'. Notably, the spacing between the pressure sensor locations on the fictitious source-receiver line may be smaller than the spacing between the pressure sensor locations on the first and second streamers 2, 2'.

In one implementation, the seismic data on the fictitious source-receiver line are assumed to be substantially the same as the seismic data on the first and second streamers 2, 2' set. Assuming that the earth is rotationally symmetric around the source 1, i.e., horizontally layered, 2D filters may be used to decompose the projected seismic data on the fictitious source-receiver line. The 2D filters may be functions of $k_r$, the horizontal wavenumber, along the fictitious source-receiver line. As such, at step 240, the projected seismic data may be decomposed into up-going wavefields and down-going wavefields along the fictitious source-receiver line using the initial values obtained at step 210.

In one implementation, the seismic data may be decomposed using Equation (1) as shown below:

$$P^U(\omega, k_r, z_1) = \frac{\exp(ik_z\Delta z)P(\omega, k_r, z_2) - \exp(2ik_z\Delta z)P(\omega, k_r, z_1)}{1 - \exp(2ik_z\Delta z)}.$$  Equation (1)

Equation (1) may be configured to provide the up-going pressure $P^U$ at the upper streamer in an over/under streamer pair given the pressure recordings P along both streamers. Decomposition using Equation (1) may be described in more detail in Amundsen, L., 1993, WAVENUMBER-BASED FILTERING OF MARINE POINT-SOURCE DATA, Geophysics, 58, 1335-1348, which is incorporated herein by reference.

In another implementation, the seismic data may be decomposed using Equations (2) and (3) as shown below:

$$V_z(\omega, k_r, z_1) = \frac{ik_z}{\rho\omega}\cot(k_z\Delta z)P(\omega, k_r, z_1) - \frac{ik_z}{\rho\omega\sin(k_z\Delta z)}P(\omega, k_r, z_2);$$  Equation (2)

$$P^U(\omega, k_r, z_1) = \frac{1}{2}\left(P(\omega, k_r, z_1) - \frac{\rho\omega}{k_z}V_z(\omega, k_r, z_1)\right),$$  Equation (3)

where $$k_z = \sqrt{(\omega/c)^2 - k_r^2}$$

ω is the angular frequency
ρ is the density of water
c is the velocity of water
$k_r$ is the radial wave number along the direction of decomposition
$z_1$ is the depth of the upper streamer
$z_2$ is the depth of the lower streamer $\Delta z = z_2 - z_1$ $i = \sqrt{-1}.$ Equation (2) may be configured to provide the vertical pressure gradient between the first streamer 2 and the second streamers 2', while Equation (3) may be configured to compute the up-going pressure. In one implementation, decomposition using Equation (3) may be performed by applying the method described in Amundsen, L., Rosten, T., Robertson, J. O. A. and Kragh, E., 2003, ROUGH-SEA DEGHOSTING OF STREAMER SEISMIC DATA USING PRESSURE GRADIENT APPROXIMATIONS: GEOPHYSICS, Soc. of Expl. Geophys., 70, V1-V9, which is incorporated herein by reference, to solve the second term on the right hand side of Equation (3). In this implementation, it may be desirable to solve for the following local approximation expression:

$$G^{(2)} = -\frac{ik_z}{\rho\omega\sin(k_z\Delta z)}.$$  Equation (4)

According to Raade, L., and Westergren, B., 1988, Beta— MATHEMATICS HANDBOOK: Studentlitteratur, Lund, Sweden, which is incorporated herein by reference, Equation (4) may be expanded as:

$$G^{(2)} = -\frac{i}{\rho\omega\Delta z}\sum_{n=0}^{\infty}(-1)^{n-1}\frac{2^{2n}-2}{(2n)!}B_{2n}(k_z\Delta z)^{2n},$$

where $B_n$ is the nth Bernoulli number and $-\pi < k_z\Delta z < \pi$. Making use of the binomial expansion to expand factors $(k_z\Delta z)^2$ as outlined in Amundsen et al. (2003), referenced above, and keeping only the lowest order terms on the series expansion, Equation (4) may be efficiently implemented in the space-frequency domain using only a short spatial aperture filter, which may also be referred to as a compact filter.

At step 250, given the physics of wave propagation and the knowledge that a free surface exist above the measurements, a determination may be made as to whether the up-going wavefields are consistent with the down-going wavefields. This determination may be made using various criterion, such as one described in Muijs, R., Robertsson, J. O. A., and Holliger, K., DATA-DRIVEN ADAPTIVE DECOMPOSITION OF MULTICOMPONENT SEABED RECORDINGS, Geophysics, 69, 1329-1337, 2004, which is incorporated herein by reference.

If it is determined that the up-going wavefields are not consistent with the down-going wavefields, then the initial values obtained at step 210 may be optimized (step 260). During this optimization, either the vertical distance (or separation) between the first streamer 2 and the second streamer 2', the inline (or horizontal) separation between the streamers, or both may be modified. Once optimized, the decomposition step at step 240 may be repeated using the modified values. Steps 240-260 may be repeated until the up-going wavefields and the down-going wavefields are consistent. Although the optimization step is described as modifying either the vertical separation between the first streamer 2 and the second streamer 2', the inline separation between the streamers or both, it should be understood that in some implementations the optimization step may modify other seismic survey parameters that would affect the consistency between up-going wavefields and down-going wavefields, as previously mentioned in the above paragraphs.

At step 270, a determination may be made as to whether a fictitious source-receiver line through another pressure sensor location of interest needs to be created. If there is still another fictitious source-receiver line through another pressure sensor location of interest that needs to be created, then processing returns to step 210. In this manner, all pressure locations on the first streamer 2, the second streamer 2' or both may be filtered using method 200 described herein. As a result of using implementations of various technologies described herein, any insufficient sampling in the crossline direction may be compensated.

Figure 4:
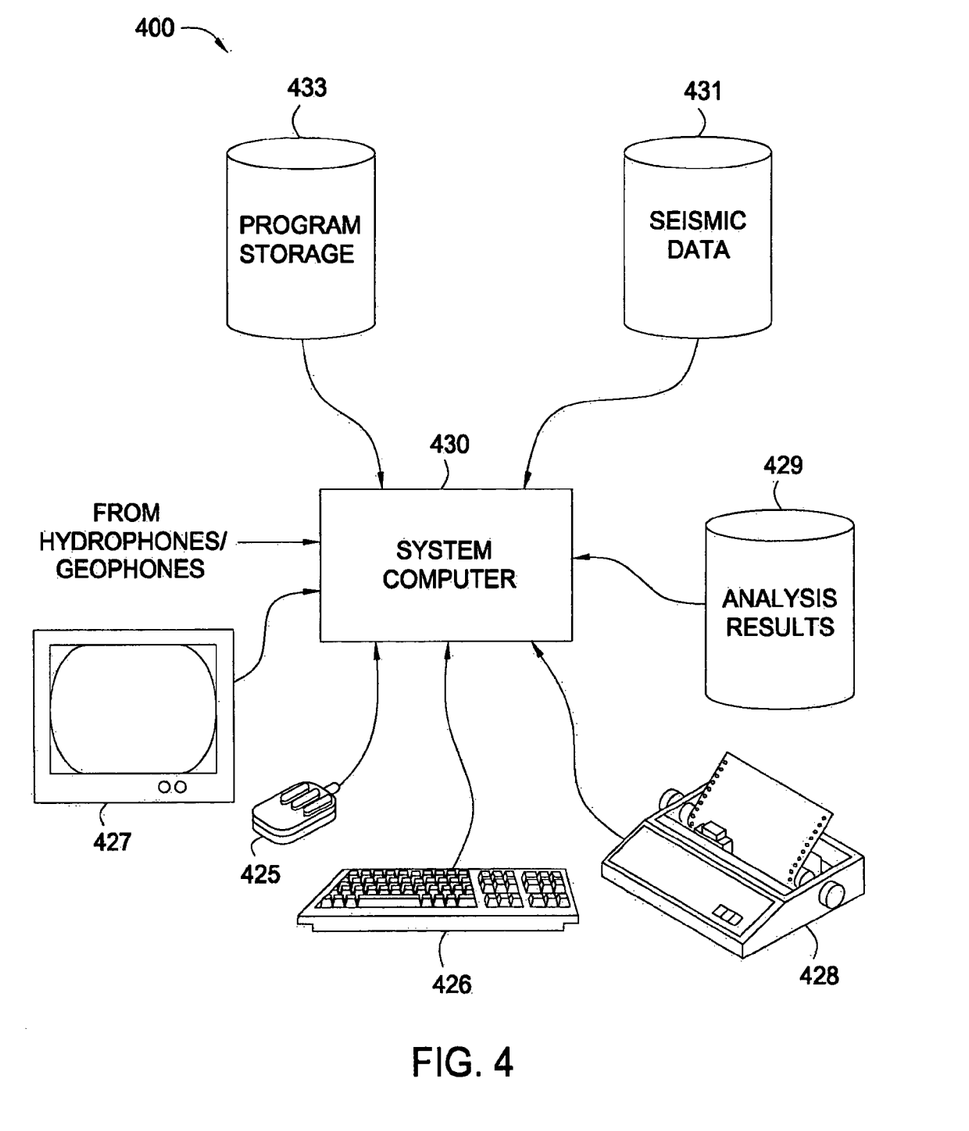
FIG. 4 illustrates a computer network into which implementations of various technologies described herein may be implemented.

FIG. 4 illustrates a computer network 400 into which implementations of various technologies described herein may be implemented. The computer network 400 may include a system computer 430, which may be implemented as any conventional personal computer or server. However, it should be understood that implementations of various technologies described herein may be practiced in other computer system configurations, including hypertext transfer protocol (HTTP) servers, hand-held devices, multiprocessor systems, microprocessor-based or programmable consumer electronics, network PCs, minicomputers, mainframe computers, and the like.

The system computer 430 may be in communication with disk storage devices 429, 431, and 433, which may be external hard disk storage devices. It is contemplated that disk storage devices 429, 431, and 433 are conventional hard disk drives, and as such, will be implemented by way of a local area network or by remote access. Of course, while disk storage devices 429, 431, and 433 are illustrated as separate devices, a single disk storage device may be used to store any and all of the program instructions, measurement data, and results as desired.

In one implementation, seismic data from the receivers may be stored in disk storage device 431. The system computer 430 may retrieve the appropriate data from the disk storage device 431 to process seismic data according to program instructions that correspond to implementations of various technologies described herein. The program instructions may be written in a computer programming language, such as C++, Java and the like. The program instructions may be stored in a computer-readable memory, such as program disk storage device 433. Of course, the memory medium storing the program instructions may be of any conventional type used for the storage of computer programs, including hard disk drives, floppy disks, CD-ROMs and other optical media, magnetic tape, and the like.

In one implementation, the system computer 430 may present output primarily onto graphics display 427, or alternatively via printer 428. The system computer 430 may store the results of the methods described above on disk storage 429, for later use and further analysis. The keyboard 426 and the pointing device (e.g., a mouse, trackball, or the like) 425 may be provided with the system computer 430 to enable interactive operation.

The system computer 430 may be located at a data center remote from the survey region. The system computer 430 may be in communication with the receivers (either directly or via a recording unit, not shown), to receive signals indicative of the reflected seismic energy. These signals, after conventional formatting and other initial processing, may be stored by the system computer 430 as digital data in the disk storage 431 for subsequent retrieval and processing in the manner described above. While FIG. 4 illustrates the disk storage 431 as directly connected to the system computer 430, it is also contemplated that the disk storage device 431 may be accessible through a local area network or by remote access. Furthermore, while disk storage devices 429, 431 are illustrated as separate devices for storing input seismic data and analysis results, the disk storage devices 429, 431 may be implemented within a single disk drive (either together with or separately from program disk storage device 433), or in any other conventional manner as will be fully understood by one of skill in the art having reference to this specification.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing seismic data, comprising:
   creating a fictitious source-receiver line connecting a source with a receiver location of interest;
   projecting one or more actual receiver locations adjacent the receiver location of interest onto the fictitious source-receiver line, wherein the spacing between the receiver locations on the fictitious source-receiver line is smaller than the spacing between the actual receiver locations; and
   decomposing seismic data on the receiver locations on the fictitious source-receiver line into up-going wavefields and down-going wavefields.

2. The method of claim 1, wherein the receiver location is one of a pressure sensor location and a particle motion sensor location.

3. The method of claim 1, wherein the seismic data are acquired from over/under streamers.

4. The method of claim 1, wherein the seismic data are acquired from conventional single streamers.

5. The method of claim 1, wherein the seismic data are acquired from multicomponent streamers.

6. The method of claim 1, further comprising receiving one or more values of seismic survey parameters.

7. The method of claim 6, wherein the one or more values comprise a vertical separation between an upper streamer and a lower streamer of an over/under streamer pair.

8. The method of claim 6, wherein the one or more values comprise inline separations between the streamers.

9. The method of claim 6, wherein the one or more values comprise at least one of wave-height over the streamer as a function of time and receiver locations and calibration filters for the receivers.

10. The method of claim 6, wherein the one or more values comprise at least one of the depth of the streamer, rotation angles of the particle motion sensors, calibration filters for particle motion sensors and calibration filters for pressure sensors.

11. The method of claim 6, wherein the seismic data are decomposed using the one or more values.

12. The method of claim 6, further comprising determining whether the up-going wavefields are consistent with the down-going wavefields.

13. The method of claim 12, further comprising modifying the one or more values if the up-going wavefields are inconsistent with the down-going wavefields.

14. The method of claim 13, further comprising decomposing the seismic data on the receiver locations disposed on the fictitious source-receiver line into up-going wavefields and down-going wavefields using the modified values.

15. The method of claim 1, wherein the seismic data are decomposed using a 2D filter.

16. The method of claim 15, wherein the 2D filter comprises a spatial aperture based on using less than the total number of actual receiver locations on the streamers.

17. A method for processing seismic data, comprising:
   (a) receiving one or more values of seismic survey parameters;
   (b) creating a fictitious source-receiver line connecting a source with a receiver location of interest;
   (c) projecting one or more actual receiver locations adjacent the receiver location of interest onto the fictitious source-receiver line, wherein the spacing between the receiver locations on the fictitious source-receiver line is smaller than the spacing between the actual receiver locations;
   (d) decomposing seismic data on the receiver locations on the fictitious source-receiver line into up-going wavefields and down-going wavefields using the one or more values; and
   (e) determining whether the up-going wavefields are consistent with the down-going wavefields.

18. The method of claim 17, further comprising (f) modifying the one or more values if the up-going wavefields are inconsistent with the down-going wavefields.

19. The method of claim 18, further comprising repeating steps (d) through (f) until the up-going wavefields and down-going wavefields are consistent.

20. The method of claim 17, wherein the seismic data are decomposed using a 2D filter.

21. A computer-readable medium having stored thereon computer-executable instructions which, when executed by a computer, cause the computer to:

receive one or more parameters of an over/under streamer pair;

decompose seismic data into up-going wavefields and down-going wavefields using the one or more parameters; and determine whether the up-going wavefields are consistent with the down-going wavefields.

22. The computer-readable medium of claim 21, wherein the one or more parameters comprise a vertical separation between an upper receiver streamer and a lower receiver streamer of the over/under streamer pair.

23. The computer-readable medium of claim 21, wherein the one or more parameters comprise inline separations between the streamers.

24. The computer-readable medium of claim 21, further comprising computer-executable instructions which, when executed by a computer, cause the computer to modify the one or more parameters if the up-going wavefields are inconsistent with the down-going wavefields.

25. A computer system, comprising:

a processor; and a memory comprising program instructions executable by the processor to:

create a fictitious source-receiver line connecting a source with a receiver location of interest;

project one or more actual receiver locations adjacent the receiver location of interest onto the fictitious source-receiver line, wherein the spacing between the receiver locations on the fictitious source-receiver line is smaller than the spacing between the actual receiver locations; and decompose seismic data on the receiver locations on the fictitious source-receiver line into up-going wavefields and down-going wavefields.

26. The computer system of claim 25, wherein the receiver location is one of a pressure sensor location and a particle motion sensor location.

27. The computer system of claim 25, wherein the seismic data are decomposed using a 2D filter.

28. The computer system of claim 27, wherein the 2D filter comprises a spatial aperture based on using less than the total number of actual receiver locations on the streamers.

\* \* \* \* \*